TELEVISION RECEIVER CONSTRUCTION

Filed Dec. 21, 1959 3 Sheets-Sheet 1

INVENTOR:
Russell H. McDonald

By Smyth & Roston

Attorneys,

April 16, 1963 R. H. McDONALD 3,086,079

TELEVISION RECEIVER CONSTRUCTION

Filed Dec. 21, 1959 3 Sheets-Sheet 2

INVENTOR:
Russell H. McDonald

By Smyth & Roston

Attorneys,

April 16, 1963 R. H. McDONALD 3,086,079

TELEVISION RECEIVER CONSTRUCTION

Filed Dec. 21, 1959 3 Sheets-Sheet 3

INVENTOR:
Russell H. McDonald

By Smyth & Roston
Attorneys,

United States Patent Office 3,086,079
Patented Apr. 16, 1963

3,086,079
TELEVISION RECEIVER CONSTRUCTION

Russell H. McDonald, Canoga Park, Calif., assignor to Packard-Bell Electronics Corporation, Los Angeles, Calif., a corporation of California Filed Dec. 21, 1959, Ser. No. 860,874
13 Claims. (Cl. 178—7.9)

This invention relates to the physical construction of a television receiver, and more particularly, the structural provisions for access to the working parts of a television receiver for such purposes as repair.

The invention is particularly directed to the problem of access to the interior of a television receiver of a type in which compactness is achieved largely by using an upright chassis pan having an opening to clear the neck of the picture tube. With the chassis pan positioned well forward relative to the picture tube, the depth or fore and aft dimension of the television cabinet need be little more than the length of the picture tube itself.

Such a crowded arrangement poses a problem, however, in the difficulty of access to the components of the receiver and especially the components on the inner face of the upright chassis pan. One suggestion heretofore offered for dealing with this disadvantage is not only to make the back panel of the television receiver removable in the usual manner, but also to make the front, top and two sides of the cabinet removable as a unit. This removable unit constitutes in effect a hood that may be detached and lifted from the floor of the cabinet. Such an arrangement is disclosed, for example, in the Myers patent, No. 2,896,199.

One troublesome disadvantage of this prior art solution to the problem of access is the necessity of constructing the cabinet with the removable hood in addition to the removable back panel. Such a demountable cabinet structure is not only more expensive than a conventional cabinet construction, but is also weaker because of the extensive separable joints. In addition, it takes time to disassemble and reassemble the cabinet structure when occasion for repair or servicing arises. Such a construction, moreover, is not practical where a large and laterally extensive cabinet houses such items as an additional speaker or a record player.

Another disadvantage of this prior art construction is that even with all of the upper structure of the cabinet removed, many of the components are not conveniently accessible. The picture tube is crowded so close to the upright chassis pan that it leaves little clearance space for components on the inner face of the chassis pan and, in addition, the picture tube overhangs components on the lower levels.

The present invention provides a number of features which together make the interior of the television receiver quickly and easily accessible. The new concept simplifies servicing and repair at a substantial saving for the owner. The invention further provides a cabinet construction that is not only more sturdy than a demountable cabinet structure but is also less expensive to fabricate.

One of these features is the provision of a hinged mount for the upright chassis pan that permits the chassis pan to be swung rearward in the manner of a door for full accessibility to all the components inside the cabinet. A second feature is the mounting of the tuner unit on the upright chassis pan in a retractable manner to keep the tuner unit from encountering the picture tube and thus limiting the rearward swinging movement of the chassis pan.

A third feature is the provision of relatively long wires for connecting the chassis pan with fixed components inside the cabinet thus to make it unnecessary to break these connections when the chassis pan is swung rearward. The high voltage anode lead must be relatively short but this lead can be disconnected and then temporarily reconnected by a jumper cord after the chassis pan is swung rearward. Thus the invention facilitates the factory assembling and testing in addition to simplifying the task of a repair man by making it possible for the television receiver to function when the chassis pan is swung rearwardly outward for full exposure of the circuit components.

A fourth feature is the provision of a hinge means that is releasable for complete disconnection of the chassis pan from the cabinet. A fifth feature is the construction of the chassis pan with a base of ample dimensions to permit the chassis pan to stand upright on a horizontal surface in a stable manner. This feature is useful when the chassis pan is completely separated from the television receiver and also has utility in the assembled position of the chassis pan since it gives the chassis pan stability independently of the means for releasably securing the chassis pan in the cabinet.

The various features and advantages of the invention may be understood from the following detailed description together with the accompanying drawings.

In the drawings, which are to be regarded as merely illustrative:

Figures 1, 2:
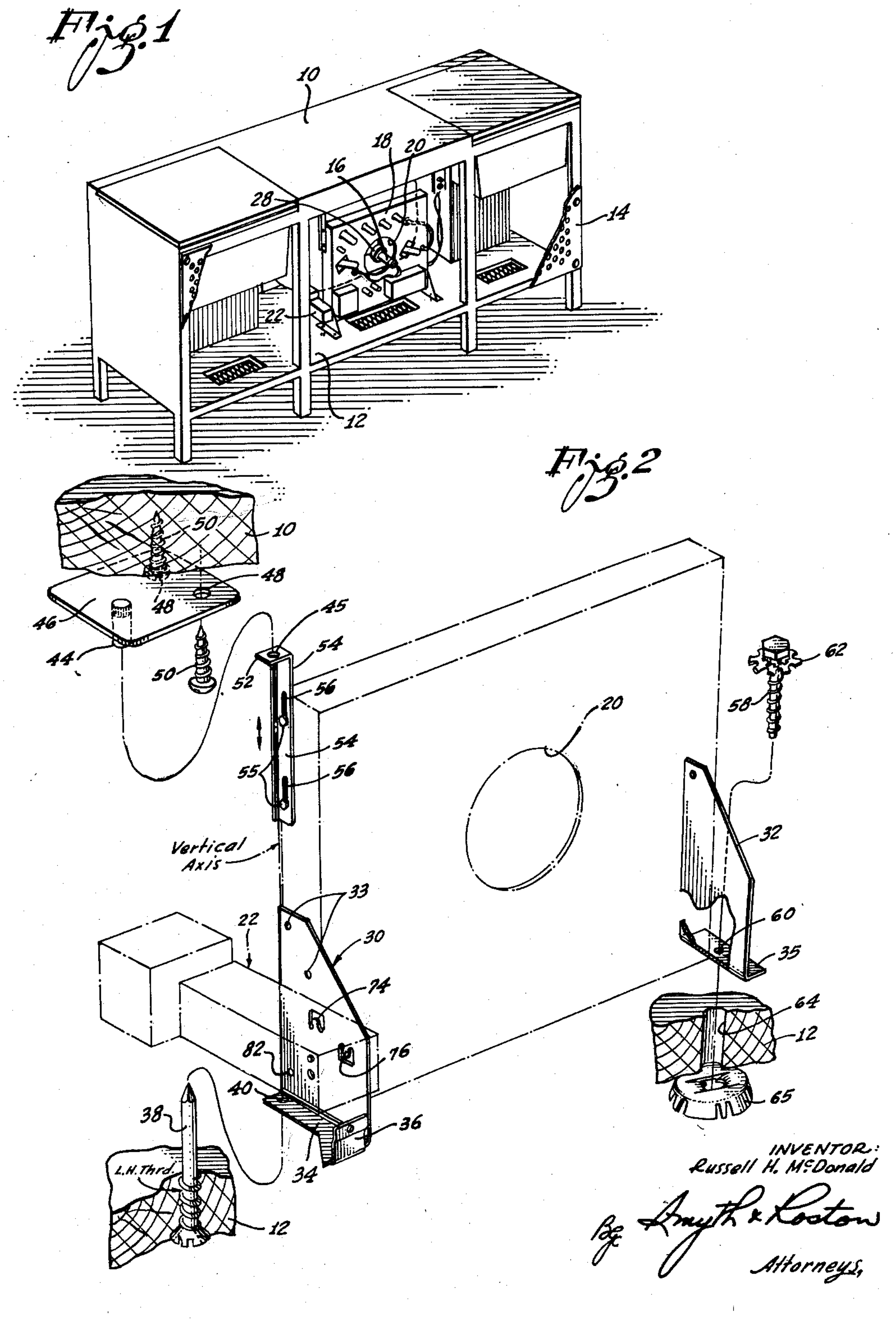
FIG. 1 is a rear perspective view of a television receiver incorporating the preferred practice of the present invention, the removable back panel of the receiver being broken away to show concealed structure.
FIG. 2 is a simplified diagrammatic perspective view showing the construction of the hinge means for mounting the upright chassis pan and also showing the releasable means for normally securing the chassis pan against swinging movement.

FIG. 1, which embodies the presently preferred practice of the invention, shows a television cabinet generally designated C which has a top wall 10 and a bottom wall or floor 12 and which is closed on its rear side in the usual manner by a removable panel 14. The working parts of the television receiver include a picture tube 15 having a rearwardly extending neck 16. An upright chassis pan 18 has a large central opening 20 to clear the picture tube neck and is positioned well forward relative to the picture tube. The upright chassis pan 18 has the usual circuit components on its forward and rearward faces and has an elongated tuner unit 22 which extends forward adjacent one side of the picture tube 15.

The usual relatively short high voltage anode lead 24 extends from circuit components on the chassis pan 18 and is releasably connected to the picture tube 15. Circuit components on the upright chassis pan 18 are also connected by a bundle of wires 25 to the end of the picture tube neck 16 and are connected by a second bundle of wires 26 to the usual yoke 28 that surrounds the picture tube neck and incorporates the usual deflection coils. In accord with the invention, these two bundles of wires 25 and 26 are longer than usual, being long enough to permit the upright chassis pan to be swung rearward in the manner of a door.

It is contemplated that the upright chassis pan 18 will be provided with a base that is sufficiently dimensioned in width to support the chassis pan on a horizontal surface in upright position in a stable manner. In the present embodiment of the invention, the base of the chassis pan is provided by a pair of sheet metal brackets 30 and 32 which are attached to the chassis pan near its opposite side edges, respectively, by suitable fastener elements 33. The sheet metal bracket 30 is formed with a base flange 34 and the sheet metal bracket 32 is formed with a similar base flange 35, these two base flanges providing the desired stable base for the chassis pan. The base flange 34 of the bracket 30 has an upwardly extending forward tongue 36 for mounting certain circuit components including the usual circuit breaker or thermoswitch (not shown). By virtue of the two base flanges 34 and 35, the chassis pan 18 will stand upright in a stable manner on a horizontal surface.

The chassis pan 18 may be hingedly or swingably mounted inside the television cabinet C in any suitable manner. It is also to be noted that the tuner unit 22 may be movably mounted on the upright chassis pan in any suitable manner. In this particular embodiment of the invention, the upright chassis pan is pivotally connected to the cabinet C by a lower pivot means associated with the base flange 34 and an upper pivot means on the same vertical axis. Normally the chassis pan is anchored against swinging movement out of its assembled position by suitable releasable means associated with the second base flange 35.

In the construction shown, a lower hinge means for the upright chassis pan 18 comprises a pivot member 38 and a socket 40 into which the pivot member normally extends. The pivot member 38 is in the form of a special screw that extends upward through the floor 12 of the television cabinet. The socket 40 comprises simply a bore in the base flange 34, the base flange itself serving as a socket member. It is apparent that the pivot member 38 may be unscrewed from below for complete retraction from the socket 40, but there is clearance above the chassis pan to permit the chassis pan to be lifted clear of the pivot member without the necessity of retracting the pivot member itself.

On the same vertical axis as the pivot member 38 is an upper hinge means comprising a pivot member 44 and a socket 45 into which the pivot member extends. The pivot member 44 is in the form of a downward extending pin mounted on a small plate 46. The plate 46 is apertured as indicated at 48 to receive a pair of wood screws 50 whereby the plate is attached to the top wall 10 of the cabinet C. The socket 45 comprises a bore in a flange 52 of an upper sheet metal bracket 54. Thus the flange 52 may be termed a socket member. The sheet metal bracket 54 is mounted on the side of the upright chassis pan 18 by a pair of screws 55 that extend through a corresponding pair of vertical slots 56 in the bracket. It is apparent that the screws 55 may be loosened for downward retraction of the sheet metal bracket 54 out of engagement with the pivot member 44 for disconnecting the chassis pan from the cabinet.

The means for normally holding the upright chassis pan 18 against swinging movement out of its normal assembled position may comprise a screw 58 that extends through an aperture 60 in the second base flange 35. In the construction shown, the screw 58 is provided with a resilient lock washer 62. The screw 58 extends downward through a bore 64 in the bottom wall 12 and on the other side of the bottom wall engages a resilient sheet metal nut 65 of a well-known type.

Figures 5, 6:
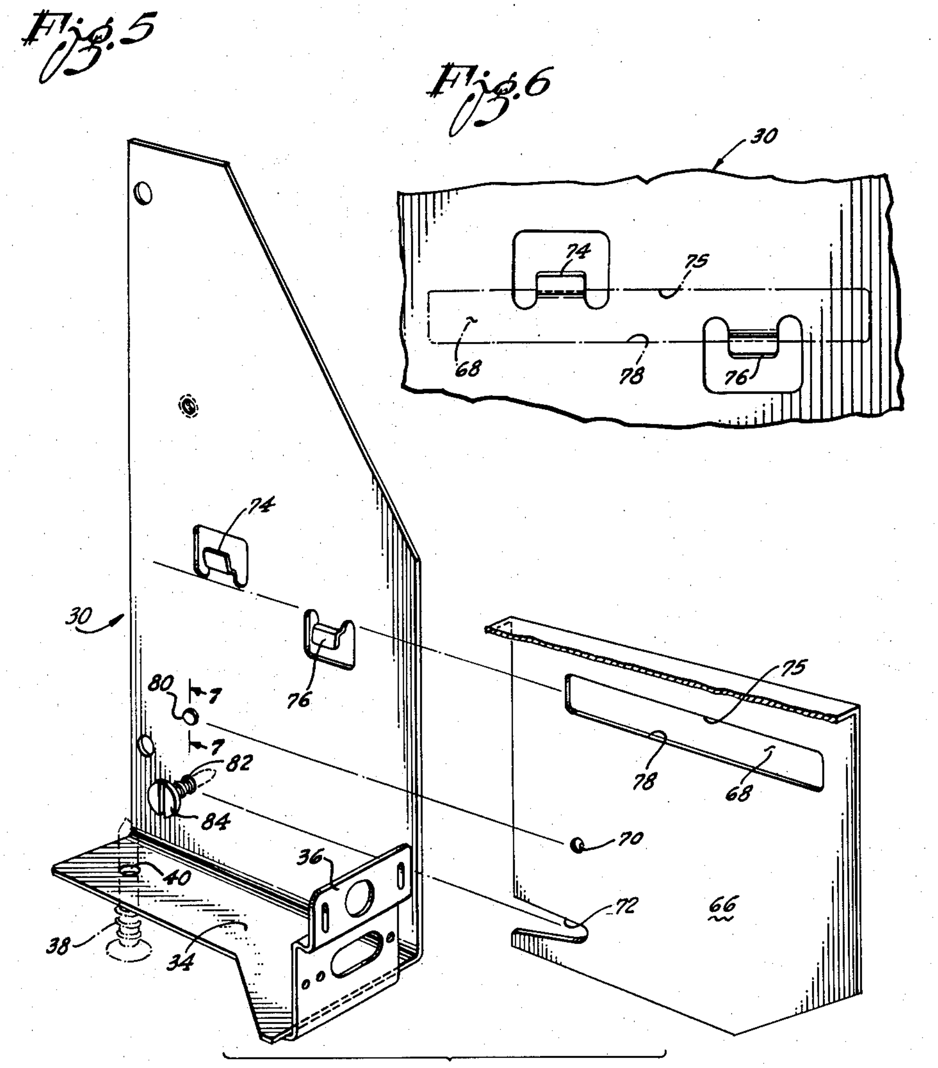
FIG. 5 is a greatly enlarged perspective view showing the structure by means of which the tuner is removably mounted on the side of the upright chassis pan.
FIG. 6 is a fragmentary plan view showing how oppositely directed tongues engage the edges of a slot in the side wall of the tuner unit.
Figure 7:
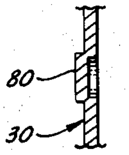
FIG. 7 is an enlarged fragmentary section along the line 7—7 of FIG. 5 showing how a detent offset may be provided on the upright chassis pan to releasably maintain the tuner unit in its assembled position.

The manner in which the tuner unit 22 may be mounted on the side of the upright chassis pan 18 may be understood by reference to FIGS. 5, 6 and 7. The elongated tuner unit 22 has a relatively short inner side wall 66 of sheet metal which is formed with a horizontal slot 68 and a small circular aperture 70. The forward edge of the side wall 66 is further provided with a tapered slot 72. The previously mentioned sheet metal bracket 30 is formed with an upwardly extending offset tongue 74 to slidingly engage the upper edge 75 of the slot 68 and is formed with a similar downwardly extending offset tongue 76 that slidingly engages the lower edge 78 of the horizontal slot. The bracket 30 is also formed with a detent projection 80 for releasable engagement with the small circular aperture 70 of the side wall 66. The detent projection 80 may be provided by deforming the sheet metal of the bracket 30 in the manner indicated in FIG. 7.

In the construction shown, the bracket 30 is further provided with a tapped bore 82 to receive a suitable screw 84. When the tuner unit 22 is in its normal forward assembled position, the detent projection 80 of the bracket 30 releasably seats in the small aperture 70 of the side plate 66 of the tuner unit and the tapered slot 72 straddles the screw 84. The screw 84 is tightened against the side wall 66 to secure the tuner unit against movement relative to the bracket. The screw 84 is accessible by a screw driver through the tuner unit 22 from the outer side of the tuner unit.

Figure 3:
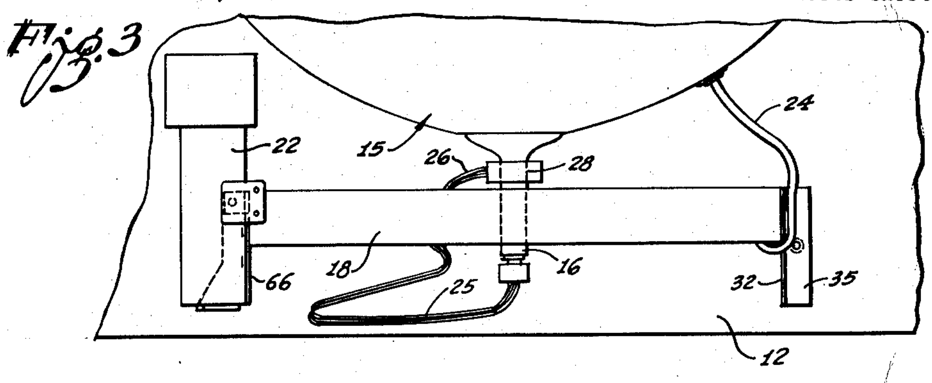
FIG. 3 is a fragmentary plan view showing the chassis pan in its assembled position.

The manner in which the invention serves its purpose may be readily understood from the foregoing description. The normal assembled positions of the parts are shown in FIGS. 1 and 3. The tuner unit 22 is in its normal forward position with the tapered slot 72 in the side plate 66 of the tuner unit straddling the screw 84, and with this screw tightened. The circular aperture 70 of the side plate 66 of the tuner unit is in engagement with the detent projection 80 of the bracket 30. It will be noted that the center of gravity of the tuner unit is well forward of the upwardly offset tongue 74 so that the tuner unit fulcrums on this tongue and is held horizontal by the second downward tongue 76.

It will be noted in FIG. 3 that the tuner unit 22 extends so close to the bell portion of the picture tube 15 that it would interfere with the clockwise swinging movement of the chassis pan 18 about the upright pivot axis adjacent its left side. To remove this hindrance to the swinging movement of the chassis pan as required for full access, a screw driver is inserted through the tuner unit 22 from the left side to loosen the screw 84. The tuner unit 22 is then pulled slightly to the left to disengage the small circular aperture 70 of the side plate 66 of the tuner unit from the detent projection 80 of the bracket 30. The released tuner unit is then pulled rearward to the limit permitted by the horizontal slot 68 in the side plate 66 of the unit. At this rearward retracted position, the tuner unit permits full freedom for the desired swinging movement of the chassis pan 18.

Figure 4:
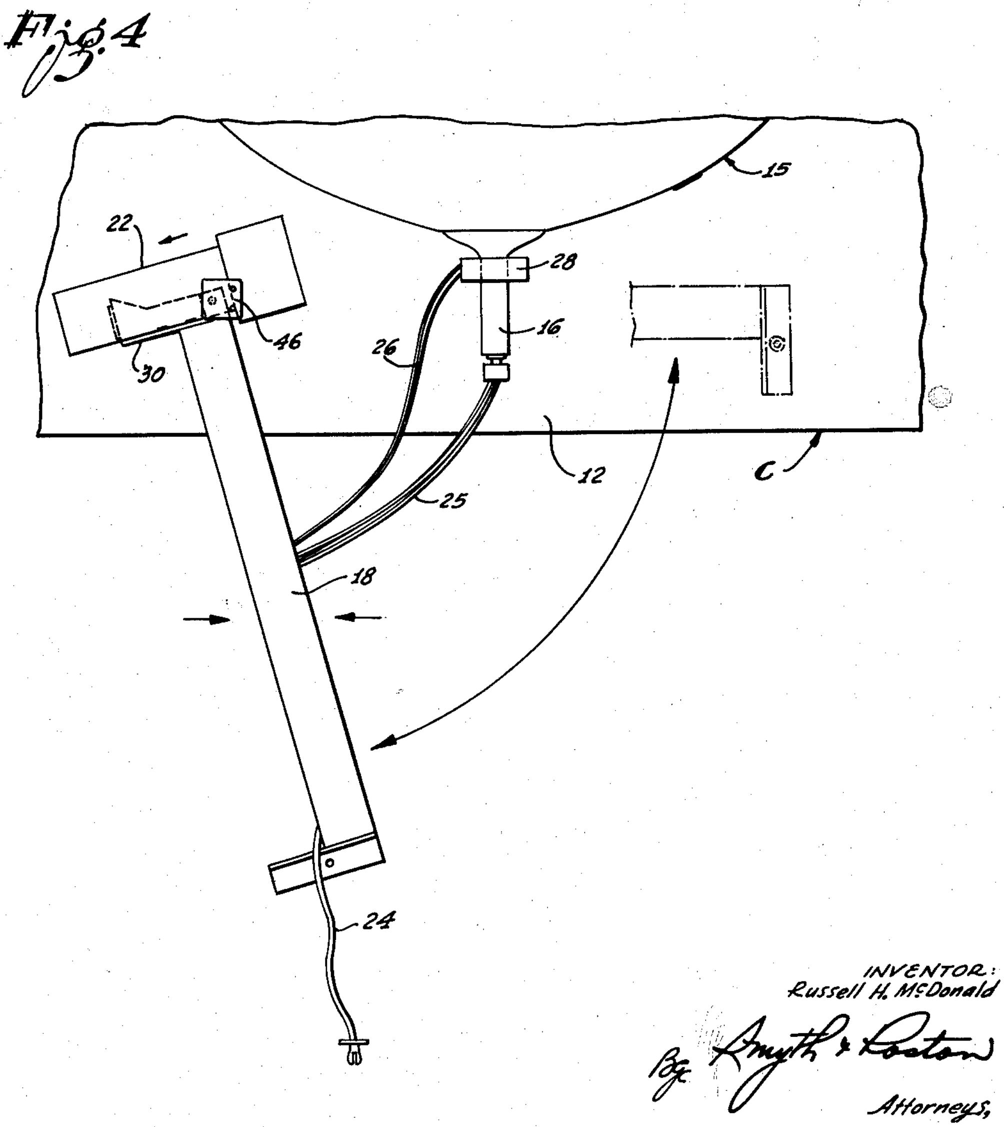
FIG. 4 is a similar view showing the chassis pan swung rearward from its normal assembled position to provide full access to the circuit components of the receiver.

To release the chassis pan 18 for the desired rearward swinging movement, the screw 58 is loosened for disengagement from the sheet metal nut 65 and is then completely withdrawn to free the chassis pan for swinging movement. The high voltage anode lead 24 shown in FIG. 3 is then disconnected and then the upright chassis pan is swung rearward in the manner shown in FIG. 4, this rearward movement being permitted by the liberal length of the two bundles of wire 25 and 26. The operator may then employ a jumper cord with the high voltage lead 24 to restore the high voltage anode connection temporarily for test purposes.

If it is desired to remove the chassis pan 18 completely from the cabinet, the two screws 55 are loosened in the two slots 56 of the upper bracket 54 to permit the upper bracket to be retracted downward out of engagement with the upper pivot member 44. The downward retraction of the upper bracket 54 provides overhead freedom for the chassis pan to be lifted out of engagement with the lower pivot member 38. If desired, the two bundles of wires may be disconnected to permit the upright chassis pan to be moved to a distance from the cabinet. The base of the chassis pan provided by the two base flanges 34 and 35, respectively, of the sheet metal brackets 30 and 32 is of adequate dimension laterally of the plane of the chassis pan to support the chassis pan upright on a horizontal surface in a stable manner. The base flanges also reinforce and stabilize the chassis pan in its normal upright position in the cabinet.

After the television circuitry has been repaired and adjusted as may be necessary, it is a simple procedure to restore the various parts to their normal positions to hold the chassis pan in its upright assembled position.

My description in specific detail of the selected embodiment of the invention will suggest various changes, substitutions and other departures from my disclosure within the spirit and scope of the appended claims.

I claim:

1. In a television receiver wherein a cabinet with an inner lower support surface houses a forwardly facing picture tube having a rearwardly extending neck portion, the combination therewith of: a rearward upright chassis pan having an opening therein to surround said neck portion of the picture tube, said chassis pan being positioned transversely of the picture tube, said chassis pan having a relatively wide base for support in upright position on said lower support surface of the cabinet; a lower pivot means anchoring the chassis pan near a lower corner thereof to the cabinet; an upper pivot means on the same axis with said lower pivot means, said upper pivot means anchoring an upper portion of the chassis pan to the cabinet; a tuner unit on said chassis pan near the pivoted edge thereof and normally extending forward therefrom adjacent one side of the picture tube in a position to encounter the picture tube when the chassis pan is swung rearwardly outward from its normal position, said tuner unit being movably mounted on the chassis pan for rearward shift relative thereto to clear the picture tube; relatively long wires connecting components on the chassis pan with fixed components in the cabinet; and means normally releasably holding the chassis pan against swinging movement, whereby said tuner unit may be shifted rearwardly on the chassis pan and said holding means may be released to permit the chassis pan to be swung rearward from its normal position without disconnecting said relatively long wires and to permit the television circuitry to function while the chassis pan is in its outwardly swung position.

2. In a television receiver wherein a cabinet, constructed for access from its rear, houses a forwardly facing picture tube and circuit components for controlling the picture viewed from the tube, the combination of: a rearward transverse upright chassis pan, the circuit components being supported by the chassis pan on the forward and rearward sides of the chassis pan, said chassis pan having an opening to clear the neck of the picture tube, the chassis pan being constructed to stand upright on a support surface upon the release of the chassis pan from the cabinet, there being a relatively short high voltage anode lead extending from the chassis pan to the picture tube, means releasably securing said chassis pan in its normal transverse position in said cabinet; and relatively long wiring connecting certain ones of the components on said chassis pan with particular ones of the components in said cabinet, whereby said anode lead may be disconnected and said securing means may be released to permit said chassis pan to be shifted rearward to a position for access to both sides of the chassis pan without disconnecting said wiring, and means connected to the chassis pan and to the cabinet and movable relative to the chassis pan and the cabinet to facilitate the removal of the chassis pan from the cabinet and the insertion of the chassis pan into the cabinet.

3. A combination as set forth in claim 2 in which said chassis pan is completely releasable by said securing means and in which the chassis pan is constructed and is connected to the cabinet for pivotal movement about one end of the chassis as a fulcrum upon the release of the securing means at the opposite end of the fulcrum.

4. In a television receiver wherein a cabinet houses a forwardly facing picture tube having a rearwardly extending neck portion, the combination of: a rearwardly positioned upright chassis pan, circuit components on both the forward and rearward sides of the chassis pan, there being a central opening in the chassis pan to surround said neck portion of the picture tube; means pivotally mounting said chassis pan inside said cabinet to obtain a pivotal movement of the chassis pan about an upright axis near one side edge of the chassis pan for pivotal movement of the chassis pan from its normal transverse position to a position extending rearwardly out of the cabinet for access to said circuit components; means releasably securing the chassis pan against swinging movement at the normal transverse position of the chassis pan, bracket means connected to the chassis pan and to the cabinet and movable relative to the chassis pan and the cabinet to facilitate the removal of the chassis pan from the cabinet and the insertion of the chassis pan into the cabinet; and support means extending from the chassis pan at the bottom of the chassis pan to provide a support for the chassis pan upon a pivotal movement of the chassis pan out of the cabinet or upon a removal of the chassis pan from the cabinet.

5. A combination as set forth in claim 4 which includes a tuner unit on said chassis pan near the pivoted edge thereof and normally extending forward therefrom adjacent one side of the picture tube in a position to encounter the picture tube when the chassis pan is swung outward from its normal position, said tuner unit being movably mounted on the chassis pan for retraction to clear the picture tube.

6. A combination as set forth in claim 4 in which said tuner unit is slidingly mounted on the chassis pan; and which includes means to releasably secure the tuner unit at its normal forward position.

7. A combination as set forth in claim 4 which includes a relatively short high voltage anode lead releasably connecting components on the chassis pan with the picture tube; and in which the remaining wires from the chassis pan to the fixed components inside the cabinet are relatively long to permit the swinging movement of the chassis pan, whereby said anode lead may be disconnected to permit the chassis pan to be swung outward and then the anode lead connection may be temporarily restored by a jumper cord to permit the television circuitry to function fully while the chassis pan is in its outwardly swung position.

8. A combination as set forth in claim 4 in which the support means at the bottom of said chassis pan supports the chassis pan upright inside the cabinet in a stable manner; in which the vertical dimension of the chassis pan is less than the vertical dimension of the interior of the cabinet to provide clearance space above the chassis pan; and in which the bracket means pivotally mounting the chassis pan in the cabinet includes a pair of normally engaged cooperating members connected to the chassis pan and the cabinet and slidable relative to the chassis pan and the cabinet to facilitate the lifting of the chassis pan into the clearance space.

9. In a television receiver wherein a cabinet with an inner lower support surface houses a forwardly facing picture tube having a rearwardly extending neck portion, the combination therewith of: an upright chassis pan with circuit components on both its forward and rearward sides and having an opening to surround said neck portion of the picture tube, said chassis pan being positioned transversely of the picture tube; means releasably securing said chassis pan in its normal transverse position in the cabinet to permit the chassis pan to be completely removed from the cabinet for servicing, said chassis pan having a relatively wide base portion of upright support in a stable manner on a horizontal support surface; means included in said releasably securing means for providing for a pivotal movement of the chassis pan in a direction to facilitate the servicing of the television receiver; bracket means having a slot and having a flange for attachment to the cabinet; means extending through the flange portion of the bracket means to the cabinet to releasably secure the bracket means to the cabinet for providing for a removal of the chassis pan from the cabinet; and means extending through the chassis pan and the slot in the bracket means to provide an adjustable connection of the chassis pan to the bracket means for adjustment of the position of the chassis pan relative to the bracket means to facilitate the removal of the chassis pan from the cabinet and the insertion of the chassis pan into the cabinet.

10. The combination set forth in claim 9 in which additional releasably securing means extend from the chassis pan to the cabinet at a position removed from said first mentioned releasably securing means to prevent the chassis from being pivoted in the cabinet.

11. In a television receiver wherein a cabinet houses a forwardly facing picture tube having a rearwardly extending neck, an upright chassis pan, electrical components on the forward and rearward sides of said chassis pan, there being a circular opening in the chassis pan to receive the neck of the picture tube and to clear the neck of the picture tube, the chassis pan being provided with portions at their bottom surface to provide a support for the chassis pan upon a pivotal movement of the chassis pan from the receiver, means to secure the upright chassis pan in its assembled position, said securing means comprising: lower hinge means in the form of a pivot member and a socket member paired therewith adjacent one side edge of the chassis pan; an upper hinge means in the form of a pivot member and a socket member paired therewith on the same vertical axis as the lower pivot means, one member of each of said pairs of pivot members and socket members being mounted on the cabinet and the other member of each of said pairs being mounted on the chassis pan, one member of each of said pairs of pivot members and socket members being retractable from the other member of the pair for complete release of the chassis pan from the cabinet, one of the hinge means being slotted to provide for a sliding movement of the hinge means relative to the socket member to facilitate the removal of the chassis pan from the cabinet of the television receiver and the insertion of the chassis pan into the cabinet of the television reeciver; and means spaced from said vertical axis and normally releasably connecting the chassis pan with the cabinet to hold the chassis pan at its normal assembled position.

12. In a television receiver wherein a cabinet houses a forwardly facing picture tube having a rearwardly extending neck, an upright chassis pan, first electrical components on the forward and rearward sides of the chassis pan, there being a circular opening in the chassis pan to receive the neck of the picture tube and to clear the neck of the picture tube, means to secure the upright chassis pan in its assembled position, said securing means comprising: base flange means on said chassis pan and dimensioned to support the chassis pan upright on a horizontal surface in a stable manner; lower hinge means in the form of a pivot member and a socket member paired therewith; upper hinge means in the form of a pivot member and a socket member paired therewith on the same vertical axis as the lower pivot means, one of said members of the lower hinge means being mounted on the cabinet and the other member being mounted on said flange means, one of said members of the upper pair being mounted on said cabinet and the other member of the upper pair being mounted on the chassis pan, one member of each of said pairs of members in the lower and upper being retractable from the other member of the pair for complete release of the chassis pan from the cabinet; one member of one of said pairs of hinge members and socket members being slotted to provide for a slidable relationship between said hinge and socket members for facilitating the insertion of the chassis pan into the cabinet and the removal of the chassis pan from the cabinet; second electrical components supported by the cabinet; means spaced from said vertical axis and normally releasably connecting the chassis pan with the cabinet to hold the chassis pan in its normal assembled position; and relatively long wiring extending from the first electrical components to the second electrical components to maintain the electrical connections from the first electrical components to the second electrical components upon a removal of the chassis pan from the cabinet or upon a pivotal movement of the chassis pan out of the cabinet.

13. A combination as set forth in claim 11 in which clearance space is provided above the chassis pan and in which the retraction of said one member of the upper pair of members permits the chassis pan to be lifted along the slot in said member into said clearance space thereby to disengage the lower pair of members.

References Cited in the file of this patent

UNITED STATES PATENTS

| | | |
|---|---|---|
| 858,572 | Cannan | July 2, 1907 |
| 2,839,745 | Pyle | June 17, 1958 |
| 2,917,676 | Daniels | Dec. 15, 1959 |
| 2,922,081 | Dubin | Jan. 19, 1960 |
| 2,986,600 | Pifer | May 30, 1961 |

FOREIGN PATENTS

| | | |
|---|---|---|
| 268,475 | Great Britain | Oct. 12, 1926 |
| 1,146,450 | France | Nov. 12, 1957 |